April 23, 1940.  F. L. O. WADSWORTH  2,198,068

TAKE-OUT MECHANISM

Original Filed Jan. 18, 1935  2 Sheets-Sheet 1

INVENTOR
Frank L. O. Wadsworth, Dec.
BY By Mildred M. Wadsworth, Adm.
Green & McCallister
Her ATTORNEY.

April 23, 1940.  F. L. O. WADSWORTH  2,198,068
TAKE-OUT MECHANISM
Original Filed Jan. 18, 1935  2 Sheets-Sheet 2
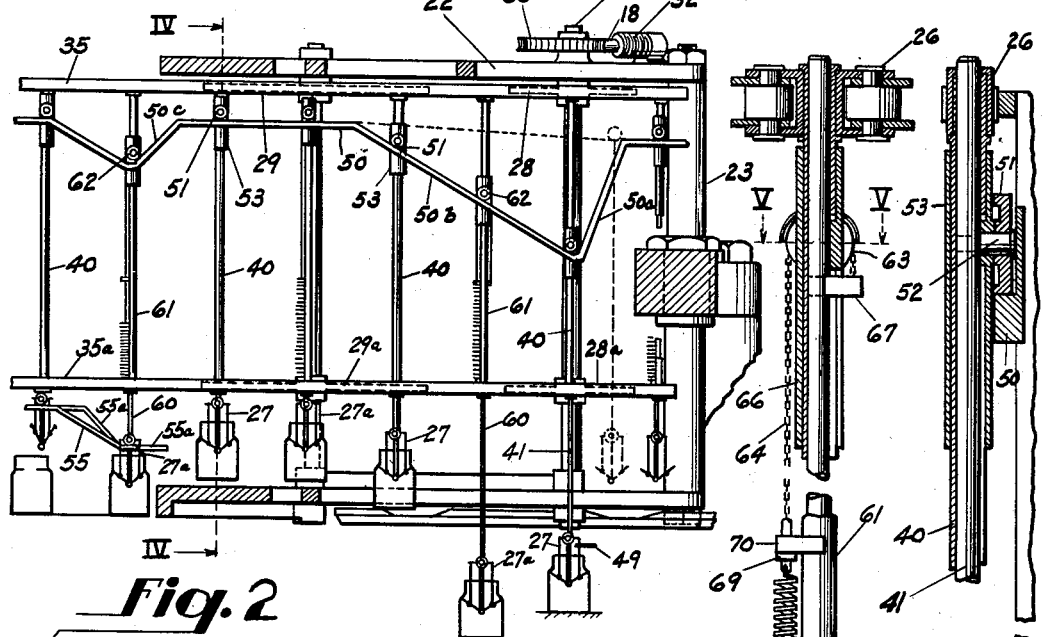
Fig. 2
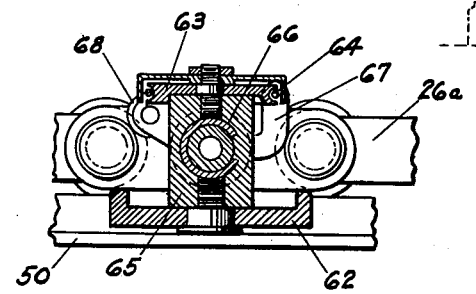
Fig. 5
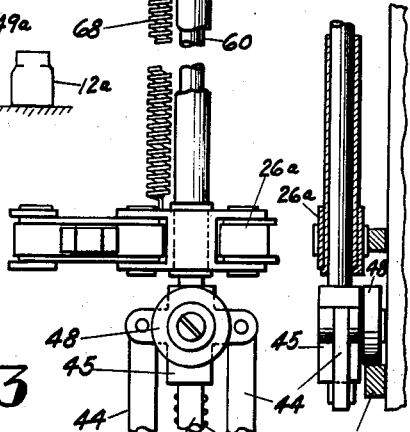
Fig. 3
Fig. 4
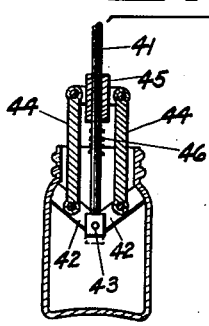
Fig. 6
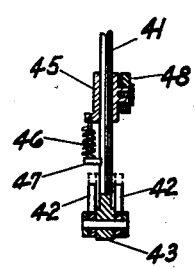
Fig. 7
INVENTOR.
Frank L. O. Wadsworth, Dec.
By Mildred M. Wadsworth, Adm.
BY Green & McCallister
Her ATTORNEY.

Patented Apr. 23, 1940

2,198,068

UNITED STATES PATENT OFFICE 2,198,068

TAKE-OUT MECHANISM

Frank L. O. Wadsworth, deceased, late of Pittsburgh, Pa., by Mildred M. Wadsworth, administratrix, Pittsburgh, Pa., assignor to Ball Brothers Company, Muncie, Ind., a corporation of Indiana Original application January 18, 1935, Serial No. 2,361. Divided and this application May 29, 1937, Serial No. 145,450

12 Claims. (Cl. 198—179)

This invention relates to a machine for fabricating articles from molten glass and more particularly to a take-out mechanism for removing the formed articles from the machine, and is a division of a pending application Serial No. 2,361, filed January 18, 1935, by Frank L. O. Wadsworth, deceased.

The primary object of the present invention is to provide an improved form of take-off or article delivery mechanism for a glassware forming machine having a series of article engaging devices each of which is adapted to reach down into an open or partially opened blow mold, engage the blown article contained therein and when the mold is completely opened to remove the article therefrom and deposit it on a moving conveyor which will carry it to an annealing lehr.

This and other objects of this invention which will be made apparent to those skilled in the art are accomplished by means of this invention, one embodiment of which is described in the following specification and illustrated in the accompanying drawings, wherein Figure 1 is a top plan view of a forming machine equipped with the improved take-out mechanism;

Fig. 2 is a developed elevation of a portion of the take-out mechanism adjacent the curvilinear plane II—II of Fig. 1 with the subjacent parts projected on the flat plane IIa—IIa of the same figure;

Fig. 3 is an enlarged front view (partly in section) of one of the elements of the mechanism shown in Fig. 2;

Fig. 4 is an enlarged cross section on the plane IV—IV of Fig. 2 and illustrates another element of this mechanism;

Fig. 5 is an enlarged sectional plan view on the plane V—V of Fig. 3; and

Figs. 6 and 7 are transverse sectional views of another portion of the delivery apparatus.

Figure 1:
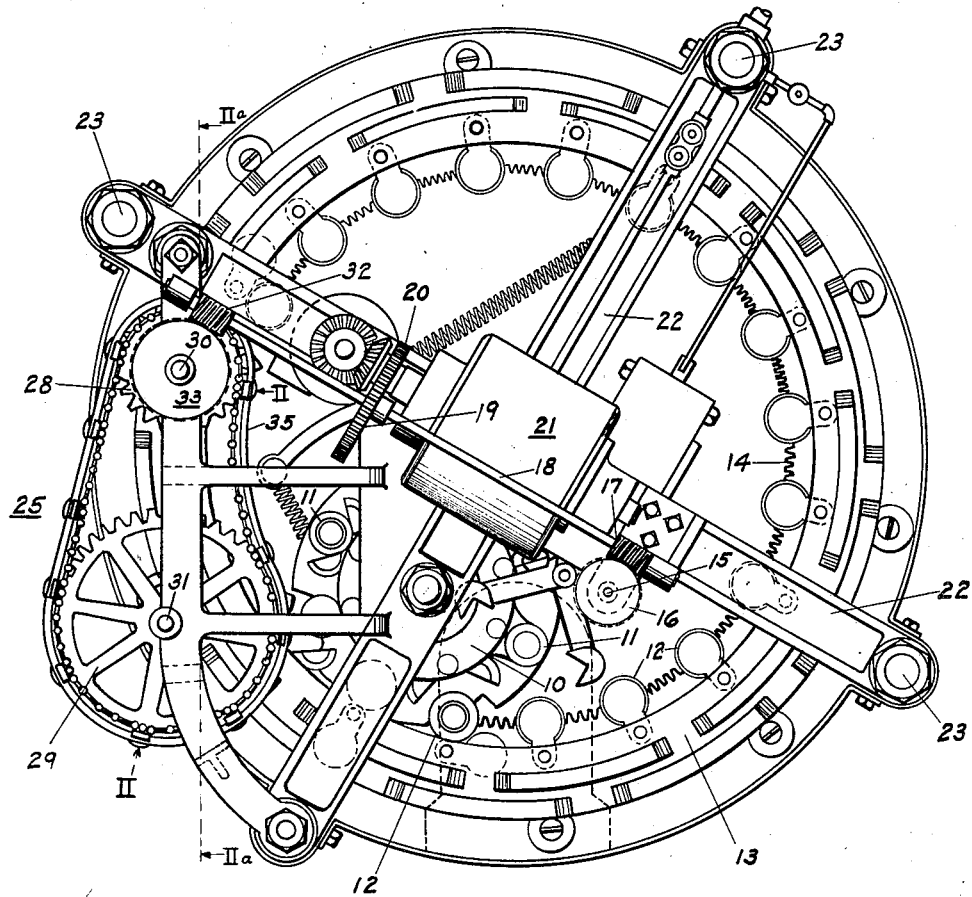

Referring to the drawings in detail, 10 represents the press mold table of a forming machine which is provided with a series of press molds 11 arranged in two tiers or decks thereon into which charges of molten glass adapted to be formed into articles are delivered by a suitable mechanism. The glass charges so delivered to the press molds 11 are pre-shaped by a suitable plunger mechanism (not shown) into parisons. After the parison has been formed the press molds 11 open and the parison is transferred to blow molds 12 carried in two tiers or decks on the inner periphery of an annular mold table 13 which surrounds the press mold table 10 and is arranged eccentrically thereto. The blow mold table 13 is provided with an annular internal gear 14 which meshes with an external gear on the press mold table 10 and the two tables (10—13) are driven at the same peripheral speed through a vertical drive shaft 15 which is provided at its upper end with a worm gear 16 that meshes with a worm 17 on a horizontal shaft 18. The shaft 18 is also provided with a gear 19 that meshes with a pinion 20 on the shaft of the motor 21. The motor 21 and shaft 18 are supported on a head frame 22 which is mounted on upright posts 23 forming the side posts of the machine. The parisons, delivered to the blow molds, are blown to finished form and the blown or finished articles are removed from the blow molds as said molds are opened in the usual manner by a take-out mechanism 25 which positions the articles on the conveyor of a lehr where the articles are annealed.

The take-out mechanism 25 includes two sprocket chains 26—26a which are vertically spaced and which cooperate in carrying a plurality of take-off devices 27—27a. Each chain meshes with and is in effect carried by a pair of cooperating sprocket wheels 28—29 which are mounted on vertical shafts 30—31 that are journaled in suitable bearings carried by the machine frame. The sprocket shaft 30 is driven from the motor 21 through the driven shaft 18 which is provided with a worm 32 that meshes with a worm wheel 33 secured to the upper end of the shaft 30. The gearing between the shaft 18 and the shaft 15 for driving the mold tables is such that the linear movement of these sprocket chains (26—26a) is the same as the peripheral speed of the centers of the mold units 11—12, that is the chains move through a distance equal to the circumferential spacing between two blow molds for each revolution of the shaft 15.

With this arrangement of the sprockets and wheels each chain 26—26a moves in a substantially horizontal path, a guard 35—35a is also preferably employed in connection with each chain and, as shown in Fig. 1, these guards are so shaped as to cause the portions of the chains leaving the driving sprockets 28—28 and moving toward the sprockets 29—29 to follow an arc-shaped path whose center of curvature is coincident with the center of revolution of the blow mold table 13. The guards for both chains may also be so formed as to assist in preventing any sagging of the chains between their sprocket supports.

Each take-off device 27 and 27a is secured to and carried by both chains 26—26a and all of these devices are therefore constrained to move in parallel relationship with each other as they travel with the chains. There are two sets of these devices; one 27 for engaging and removing blown articles from the blow mold units 12 carried on the upper deck of the table 13 and the other 27a for performing that function in connection with the blow mold units 12 carried on the lower deck of the table 13—the devices of one set being alternately arranged with those of the other set. As best shown in Figs. 2 and 4, each take-off member 27 is carried by a tubular sleeve 40, which extends vertically between the two chains 26—26a—with its upper end secured to a link of the upper chain and its lower end correspondingly secured to a link of the lower chain—and which serves as a guide for a longitudinally reciprocable rod 41. As best shown in Fig. 6, the lower end of each rod 41 carries a pair of article engaging fingers 42, which are pivotally connected thereto by a fulcrum pin 43, and which are also connected by the links 44 to a sliding collar 45 on the rod 41. A coil spring 46 is attached at one end to the collar 45 and at the other to a pin 47 rigidly secured to the rod 41 (Fig. 7) and is adapted to yieldingly pull the collar downwardly and thus move the fingers 42—42 to an expanded position, shown in Fig. 6;—it being understood that this expansion movement may be limited by any suitable stop elements on the rod or on the fingers. Each collar 45 is provided with a laterally offset roller 48 which is adapted to engage a short stationary section of cam track 49 (Fig. 2), for the purpose of holding up the collar element 45, and thus collapsing the finger 42—42 when the rods 41 and the parts carried thereby are moved downwardly to engage a blown article.

The longitudinal movement and the longitudinal positioning of each rod 41 is accomplished by a continuous cam track 50 that is parallel with the path of travel of the chains 26—26a and is adapted to be engaged by rollers 51 which are carried by an outer sleeve element 53 (one on each of the tubular members 40) and are operatively coupled to the rods 41 by the journal pins 52 that project through longitudinal slots in the sides of the tubular guide member 40.

The continuous cam track 50 is of such form that as each take-off device is moved into registry with the path of travel of the blow molds 12—by the guiding action of the revolving sprocket wheel 28 and the guard 35—the rod 41 is permitted to drop, under the action of gravity, and allow the article engaging fingers 42—42 to enter the open mouth of the blown article carried by the correspondingly positioned blow mold unit. This downward movement is permitted by the downwardly inclined portion 50a of the cam track 50.

In order that the article engaging fingers 42—42 may be positively retracted or collapsed prior to their entering the open mouth of the blown article, the downward movement of the collar 45 (on the downward movement of the rod 41), as above set forth, is checked by the short cam sector 49 just before the associated rod 41 reaches its lowermost position;—i. e., just before the supporting cam roller 51 reaches the lower end of the inclined cam track section 50a. Immediately after the rod 41 reaches the limit of its downward movement, the associated cam roller 48 rides off the end of the cam track 49 and releases the collar 45, thus permitting the spring 46 to draw the parts 45 and 47 toward each other thereby expanding the fingers 42—42. The next increment of forward movement causes the cam roller 51 to engage with the upwardly inclined leg 50b of the track 50 thus lifting the associated rod 41 and bringing the expanded fingers 42—42 into engagement with the shoulders of the blown article, as clearly shown in Figs. 2 and 6.

The continued advance of the cam roller 51 along the cam track section 50b—and the resultant upward movement of the rod 41—lifts the blown article from the mold table 13 and carries it up to a level above the top plate of that table, after which it is moved laterally outward—(by the passage of the chains 26—26a around the periphery of the sprocket wheels 29—29a) until it is suspended above a suitable conveyor track (not shown) that leads to the annealing lehr. As the article approaches this last described position the cam roller 51 starts to move along a second downwardly inclined leg 50c of the track 50 thus again lowering the associated rod 41. Immediately prior to the time that each roller 51 arrives at the lowest point on the leg 50c, the collar roller 48 engages the end of another cam track 55 thus arresting the downward movement of the collar at the time of engagement of the bottom of the blown article with the lehr conveyor. As the rod 41 and its associated parts continue their descent the fingers 42—42 are disengaged from the shoulders of the blown article and collapsed. The roller 48 then rides upwardly on track 55 and thereby lifts the rod 41 and its associated parts—with the fingers 42—42 in their collapsed position—until they clear the top of the previously engaged article; after which the roller 51 is again engaged with the horizontal portion of the track 50 and is moved along it to the beginning of the downwardly inclined section 50a. This completes the cycle of movement of any one of the take-off devices 27.

It should be understood that the lehr conveyor is driven at a linear speed which is approximately equal to that of the travel of the chains 26—26a and that the retraced fingers 42—42 may therefore be withdrawn from the mouth of the article as the latter is moving with the conveyor without any material lateral displacement of the take-off parts with respect thereto. The path of travel of the take-off devices, around the guiding sprocket wheels 28—28a and 29—29a preferably at one point is substantially tangent to the line of movement of the lehr conveyor; and the positioning of the cam track sections 50c and 55 is preferably such that the suspended article is lowered onto the conveyor and released from the grip of the fingers 42—42 at or near this point. But it is also obvious that the collapsing of these fingers, and their withdrawal from the mouth of the article, is accomplished in a very short interval of time; and, consequently, considerable variation between the paths of travel of the take-off devices and of the released articles will not, therefore, interfere with the above described operation if it is accomplished with reasonable dispatch.

The removal of the blown articles from the mold units 12 on the lower deck of the table 13 is as previously stated effected by means of the take-up devices 27a. These devices are similar in all substantial particulars to the device illustrated in Figs. 4, 6 and 7 (as above described), except that provision is made for magnifying the longitudinal movement of the rods 60 (which carry the devices 27a) in the guide sleeves 61 as the cam roller 62 rides down and up on inclined legs 50a and 50b of the track 50. This is accomplished by omitting the trunnion connection 52 between the associated roller and sleeve elements 51—53 and the cooperating rod 41 (as previously described) and substituting therefor a double fall chain and pulley connection 63—64. As shown in Figs. 3 and 5, the cam roller 62 is in this case rotatably mounted on a block 65 which is secured to a sleeve 66 and which also carries the pulley 63. The chain 64 which passes over the pulley 63 is attached at one end to a bent arm 67 that is secured to the rod 60 and projects outward through superimposed slots in the sides of the sleeve elements 61 and 66; and is elastically connected at its opposite end to the lower conveyor chain 26a by means of a tension spring 68. This spring is primarily employed for the purpose of preventing slack in the chain when the rod 60 is lowered. It will be understood that the cam roller 62 of each take-off device 27a is operatively connected to the associated rod 60 only through the agency of the chain and pulley and that, therefore, any up or down movement of this roller—as occasioned by variations in the contour of the cam track 50—will produce a movement of the rod which is twice that of the roller. This motion multiplying device therefore permits a single cam track to be employed for actuating both sets of take-off devices although the one set must have a much larger vertical lift than the other—because of the greater height to which the articles in the lower tier of blow molds must be lifted.

In order to effect a positive and definite upward movement of the rods 60 of the take-off devices 27a, the upper ends of the take-up springs 68 are attached to shouldered pins 69 which pass loosely through laterally projecting lugs 70 on the sides of the associated guide sleeves 61 and thereby afford vertically fixed points of attachment for one end of the chain 68 when the connected cam roller and pulley elements 62 and 63 are lifted.

When the cam rollers 62 of this lower set of take-off devices 27a (the article engaging elements of which are identical with the devices 27) pass onto the downwardly inclined section 50c of the cam track 50, the associated rods 60 are lowered until the rollers 48 engage the horizontal entry part of the cam track section 55a; after which the further downward movement of the connected elements 62 and 63 is taken up by the springs 68 (as shown at the left of Fig. 2). But the articles carried by the take-off devices 27a still remain suspended therefrom until they are engaged by the lehr conveyor because the springs 46 are insufficient to collapse the fingers 42—42 as long as they are subjected to the unsupported weight of the suspended article, and the latter is therefore released to the conveyor at substantially the same point as that at which the articles are delivered thereto from the upper set of take-off devices 27.

It should be further noted that the cam track section 49a which serves to collapse the fingers 42—42 at the time the take-off devices 27a are engaged with the articles in the lower tier of blow molds must be positioned at a lower level than the section 49 and that the track section 55a—which effects the disengagement of the lower take-off devices from the articles after the latter are delivered to the conveyor—must be of different form than the section 55 (in order that the upward movement of the cooperating rods 60 may be commensurate with that of the associated roller and pulley elements 62 and 63) and for these reasons the rollers 48 (of the lower take-out devices 27a) and the track sections 49a and 55a with which they engage are positioned on the rear, or inner, side of the conveyor chains—(the sections 49a being in this case attached to the revolving table 13)—instead of on the outer side.

With the exception of the detail differences above noted the operation of the lower set of take-off devices 27a, in removing the blown articles from the bottom tier of blow molds 12a is essentially the same as the operation of the other set 27 in taking away the articles from the upper bank of molds 12. All of these articles are delivered to the lehr conveyor in regular sequence at uniformly spaced intervals, corresponding to those between the centers of the molds on the tables 10 and 13, although as noted above, the linear speed of the lehr conveyor may, if desired, be considerably varied (with respect to the table movement) for the purpose of altering the rapidity with which successive articles are carried to the annealing lehr.

It should be apparent that the characteristic features of this invention may be utilized in whole or in part and that when the take-out mechanism is to be used with a single deck table the devices 27a are replaced with devices similar to 27. While the improved take-out mechanism has been shown in connection with a two-table machine in which the tables are eccentrically positioned, it is obvious that the invention may be utilized with any type of forming machine, for example, machine in which the press mold table is mounted exteriorly of the blow mold table instead of inside of it and that various other changes in the form and arrangement of the cooperating parts may be made without departing from the spirit of the invention as defined by the appended claims.

What is claimed as new and desired to be secured by Letters Patent is:

1. A take-out mechanism comprising a pair of vertically spaced endless conveyors, fixed vertical guide sleeves carried by said conveyors, a rod reciprocably mounted within each of said sleeves, article engaging fingers pivoted to each such rod, means for reciprocating said rods during the movement of said conveyors and means for collapsing and expanding said article engaging fingers in timed relation to the movement of said rod.

2. In apparatus for use in transferring articles from a glass fabricating machine to a position removed therefrom, vertically spaced continuously moving conveyors, spaced vertically extending sleeves carried by said conveyors, a rod mounted for reciprocation within each of said sleeves, means for raising and lowering said rods relative to said sleeves, an article engaging device carried by each rod and stationary means for actuating said devices upon the up and down movements of said rods.

3. Apparatus of the character described comprising an endless conveyor moving continuously in a closed path, a vertical guide sleeve carried by said conveyor, a rod slidably mounted within said guide sleeve, collapsible article engaging fingers pivoted to one end of said rod, means for reciprocating said rod, and cam controlled means for collapsing and expanding said fingers as said rod is reciprocated.

4. Apparatus of the character described comprising an endless continuously moving conveyor, a vertically extending guide sleeve carried by said conveyor, a rod slidably mounted within said sleeve, a roller secured to said rod, a cam track on which said roller rides, article engaging fingers pivoted to said rod, and means for collapsing and expanding said fingers.

5. Apparatus of the character described comprising an endless continuously moving conveyor, a guide sleeve carried by said conveyor, a rod movably mounted in said guide sleeve, article engaging fingers carried by said rod, a member slidably mounted on said guide sleeve, means for moving said member relative to said guide sleeve, and means associated with said member on movement thereof for reciprocating said rod.

6. Apparatus of the character described comprising an endless continuously moving conveyor, a guide sleeve carried by said conveyor, a rod movably mounted in said guide sleeve, article engaging fingers carried by said rod, a member slidably mounted on said guide sleeve, means for moving said member relative to said guide sleeve, and means for moving said rod in response to the movement of said member but through greater distances than said member.

7. In a take-out and transfer mechanism, an endless conveyor movable in a horizontal closed path, a vertically extending guide sleeve carried by said conveyor, a rod reciprocably mounted in said sleeve, pivoted article engaging fingers adjacent the lower end of said rod, means for normally holding said fingers in expanded position, means for reciprocating said rod, and means for collapsing said fingers as said rod is reciprocated.

8. In a take-out and transfer mechanism, two vertically spaced endless carriers movable in a horizontal closed path, a series of vertically extending guide sleeves bridging the space between said carriers and connected thereto, a rod reciprocably mounted in each of said sleeves, article engaging fingers carried by each such rod, means for reciprocating said rods and means for collapsing and expanding said fingers as said rods are reciprocated.

9. In a take-out and transfer mechanism, vertically spaced endless carriers movable in a horizontal closed path, a series of vertically extending guide sleeves spanning the space between said carriers and connected thereto, a rod reciprocably mounted in each sleeve, collapsible article engaging fingers adjacent the lower end of each rod, means for yieldably holding said fingers in expanded position, means for successively imparting up and down movement to said rods, and means for collapsing said fingers as said rods are moved downwardly.

10. In a take-out and transfer mechanism, vertically spaced endless carriers movable in a horizontal closed path, a series of guide sleeves connected at their ends to said carriers, a rod reciprocably mounted in each guide sleeve, article engaging fingers pivoted adjacent the lower end of each rod, means for yieldingly holding said fingers in article engaging position, and a roller associated with each rod means including a cam track for imparting reciprocatory movement to said rods, and means for collapsing said fingers.

11. In a transfer mechanism, a pair of vertically spaced endless conveyors moving continuously in a closed path, a series of equally spaced vertical guide sleeves carried by said conveyors, a rod slidably mounted within each of said guide sleeves, collapsible article engaging fingers pivoted adjacent the lower end of each of said rods, means for successively reciprocating said rods and stationary means for collapsing and expanding said fingers as said rods are reciprocated.

12. In a transfer mechanism, a pair of vertically spaced endless conveyors, means for moving said conveyors in closed parallel paths, a series of vertically extending guide sleeves bridging said conveyors, a rod slidably mounted within each such sleeve, a roller secured to each rod, a cam track for each of said rollers, article engaging fingers pivoted to said rods adjacent their lower ends and stationary means for collapsing and expanding said fingers.

MILDRED M. WADSWORTH,
*Administratrix of the Estate of Frank L. O. Wadsworth, Deceased.*